(12) United States Patent
Plangetis

(10) Patent No.: US 7,328,879 B1
(45) Date of Patent: Feb. 12, 2008

(54) EQUIPMENT INSTALLATION SUPPORT ON FOUNDATION

(75) Inventor: Gus F. Plangetis, Annapolis, MD (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 9 days.

(21) Appl. No.: 11/147,652

(22) Filed: Jun. 3, 2005

(51) Int. Cl.
| F16M 1/00 | (2006.01) |
| F16M 3/00 | (2006.01) |
| F16M 5/00 | (2006.01) |
| F16M 7/00 | (2006.01) |
| F16M 9/00 | (2006.01) |
| F16M 11/00 | (2006.01) |

(52) U.S. Cl. .................. 248/679; 248/668; 248/669; 248/673; 248/678; 248/188.1; 248/188.2; 248/346.05; 248/346.06; 248/188.3; 254/104

(58) Field of Classification Search ............... 248/668, 248/669, 673, 678, 188.1, 188.2, 346.05, 248/346.06, 188.3, 679; 254/104
See application file for complete search history.

(56) References Cited

U.S. PATENT DOCUMENTS

| 1,380,347 A | * | 6/1921 | Blume ........................ 248/663 |
| 2,147,909 A | * | 2/1939 | Mafera ........................ 254/104 |
| 2,709,571 A | * | 5/1955 | Mafera ........................ 254/104 |
| 2,868,366 A | * | 1/1959 | Shiffman .................... 206/45.2 |
| 3,021,638 A | * | 2/1962 | Kristek ...................... 248/188.2 |
| 3,030,730 A | * | 4/1962 | Costar ....................... 248/188.2 |
| 3,171,632 A | * | 3/1965 | Jines ........................... 254/104 |
| 3,306,562 A | * | 2/1967 | Bellefleur ................. 248/188.2 |
| 3,452,663 A | * | 7/1969 | Machtig ..................... 248/187.1 |
| 3,528,691 A | * | 9/1970 | Matich, Jr. ................. 403/356 |
| 4,135,335 A | * | 1/1979 | Jensen ........................ 52/126.1 |
| 4,281,739 A | * | 8/1981 | Keiser ......................... 181/207 |
| 4,436,268 A | * | 3/1984 | Schriever ................. 248/188.3 |
| 4,776,548 A | * | 10/1988 | Bezenek ................... 248/188.2 |
| 4,830,320 A | * | 5/1989 | Bellows ................... 248/188.2 |
| 4,858,865 A | * | 8/1989 | Schrepfer ................ 248/188.2 |
| 5,249,767 A | * | 10/1993 | Mellen ..................... 248/188.2 |
| 5,253,964 A | * | 10/1993 | Swemmer ..................... 411/79 |
| 5,584,464 A | * | 12/1996 | Whittaker ................... 248/678 |
| 6,152,409 A | * | 11/2000 | Schrepfer ................ 248/188.2 |

(Continued)

*Primary Examiner*—Carl D. Friedman
*Assistant Examiner*—Michael McDuffie
(74) *Attorney, Agent, or Firm*—Dave A. Ghatt; Jacob Shuster

(57) ABSTRACT

A bearing washer is inserted into a horizontally elongated recess formed within the top flat surface of an upper tapered wedge of a support assembly through which equipment is adjustably positioned on a foundation. The upper wedge is vertically and horizontally adjusted in slidingly positioned contact with a lower tapered wedge along inclined surfaces within a recess formed therein before attachment of the tapered wedges to each other by horizontal fastener bolts extending through the upper wedge and the lower wedge. In such adjusted position of the wedges, a convex surface on the inserted bearing washer is in contact with a concave surface within a recess formed in the top surface of the upper wedge to support the equipment in close spaced relationship thereabove. Slidable adjustment of the wedges is limited by a recess shoulder in the lower tapered wedge to avoid excessive loading of the fastener bolts under severe shock and vibration conditions imposed on the equipment positioned on the foundation.

2 Claims, 3 Drawing Sheets

U.S. PATENT DOCUMENTS

H002009 H * 1/2002 Martin et al. ............... 248/677
6,343,439 B1 * 2/2002 Rutledge ....................... 52/27
6,702,246 B1 * 3/2004 Schriever .................... 248/656

* cited by examiner

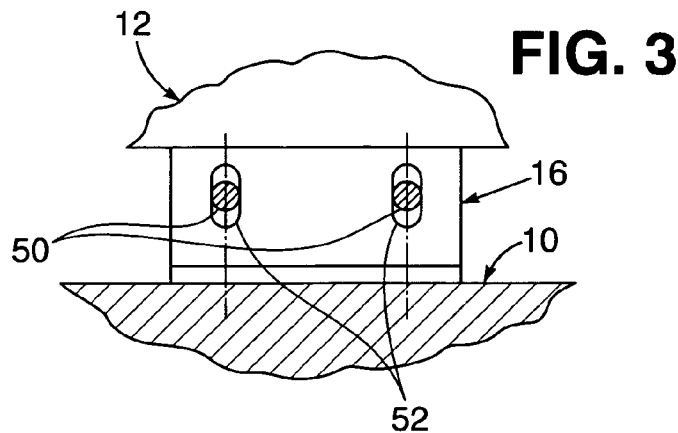
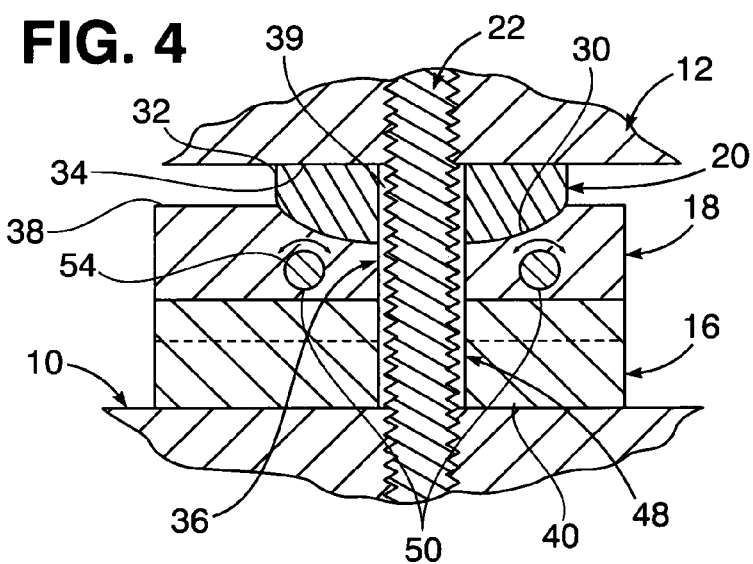
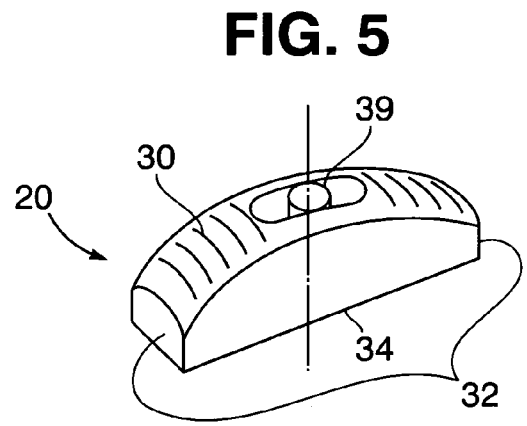

EQUIPMENT INSTALLATION SUPPORT ON FOUNDATION

The present invention relates generally to adjustably positioned support of equipment on a foundation.

STATEMENT OF GOVERNMENT INTEREST

The invention described herein may be manufactured and used by or for the Government of the United States of America for governmental purposes without the payment of any royalties thereon or therefore.

BACKGROUND OF THE INVENTION

The adjustable positioning and support of equipment on a foundation by use of tapered wedges that are bolted thereto at attachment surfaces of the equipment and for incremental height adjustment of the equipment is generally well known in the art. However, when support of the equipment on the foundation involves establishing a somewhat non-parallel relationship between the attachment surfaces of the equipment and the foundation to which the tapered wedges are bolted, assembly, installation and adjustment becomes difficult and cumbersome. It is therefore an important object of the present invention to enhance adjustable installation of equipment on a foundation involving use of the aforementioned type of interrelated tapered wedge support.

SUMMARY OF THE INVENTION

An attachment surface of a foundation has a lower tapered wedge positioned thereon with an upper tapered wedge adjustably positioned in underlying relation to an attachment surface of equipment to be supported in an adjusted position on the foundation attachment surface. Pursuant to the present invention installational support of the equipment on the foundation is enhanced by use of a bearing washer having a lower convex surface portion inserted into horizontally aligned recess and hole respectively formed in the upper and lower wedges through which a vertical attachment bolt extends between the foundation and the equipment. Vertically elongated holes are formed in the lower wedge for horizontal alignment with holes formed in the upper wedge through which horizontal bolts extends for attachment of the wedges to each other in adjusted support positions between the foundation and the equipment.

BRIEF DESCRIPTION OF THE DRAWING

A more complete appreciation of the invention and many of its attendant advantages will be readily appreciated as the same becomes better understood by reference to the following detailed description when considered in connection with the accompanying drawing wherein:

FIGS. 2, 3 and 4 are partial section views taken substantially through planes indicated by section lines 2, 3 and 4 in FIG. 1;

FIG. 5 is a perspective view of a bearing washer associated with the support assembly illustrated in FIGS. 1, 2 and 4.

DETAILED DESCRIPTION OF THE PREFERRED EMBODIMENT

Figure 1:
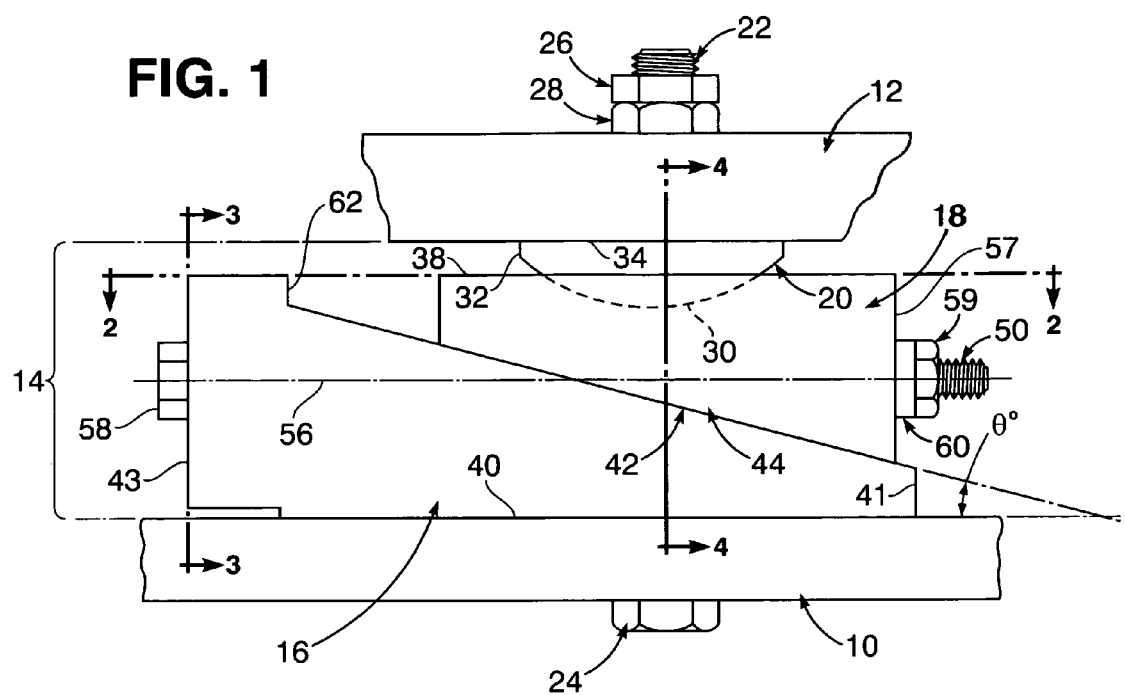
FIG. 1 is a side elevation view of a support assembly adjustably positioned between vertically spaced attachment surface portions of a foundation and equipment.
Figure 6:
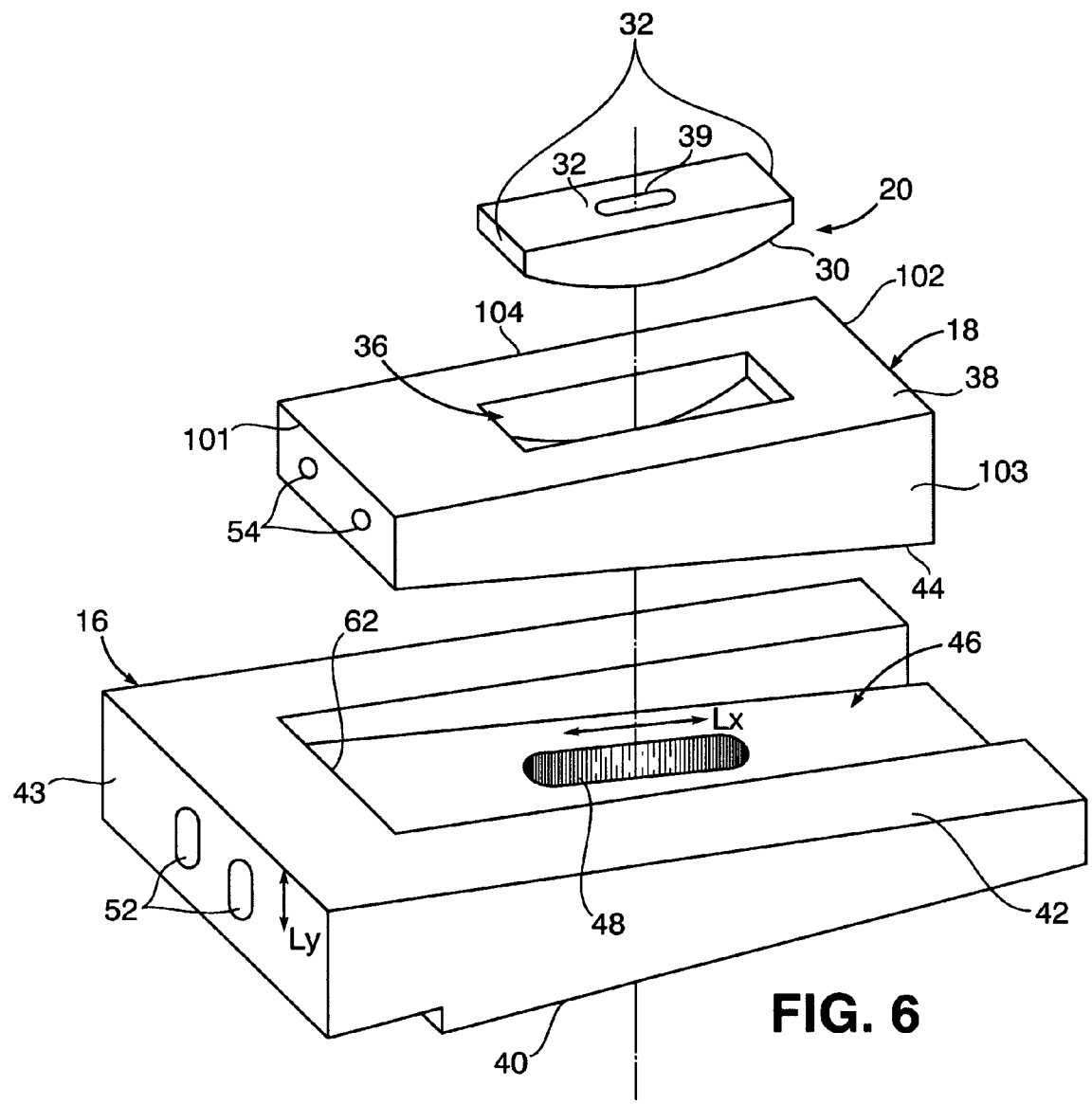
FIG. 6 is a perspective view of the disassembled washer and wedges of the support assembly illustrated in FIGS. 1-4.

Referring now to the drawing in detail, FIG. 1 illustrates a portion of a foundation 10 loaded by equipment 12 installed thereon in an adjusted position by a support assembly 14 disposed between the equipment 12 and the foundation 10. The support assembly 14 includes a lower tapered wedge 16 positioned on the foundation 10, an upper tapered wedge 18 that is adjustably positioned on the lower tapered wedge 16 and a bearing washer 20 inserted into the top of the upper wedge 18 and on which the equipment 12 is positioned. As shown in FIG. 6, the upper tapered wedge 18 includes a first end 101, a second end 102, a first side 103, and a second side 104, the first and second sides substantially perpendicular to the first and second ends. The portion of the equipment 12 adjustably positioned by the support assembly 14 on the foundation 10 is fastened thereto by a vertical threaded bolt 22 having a head 24 at its lower end in abutment with the foundation 10 and a lock nut 26 is threadedly applied thereto over a nut 28 to releasably hold all installed parts assembled. The equipment 12 may be big machinery such as power plants, diesel generators, propeller reduction alignment gearing, etc.

Figure 2:
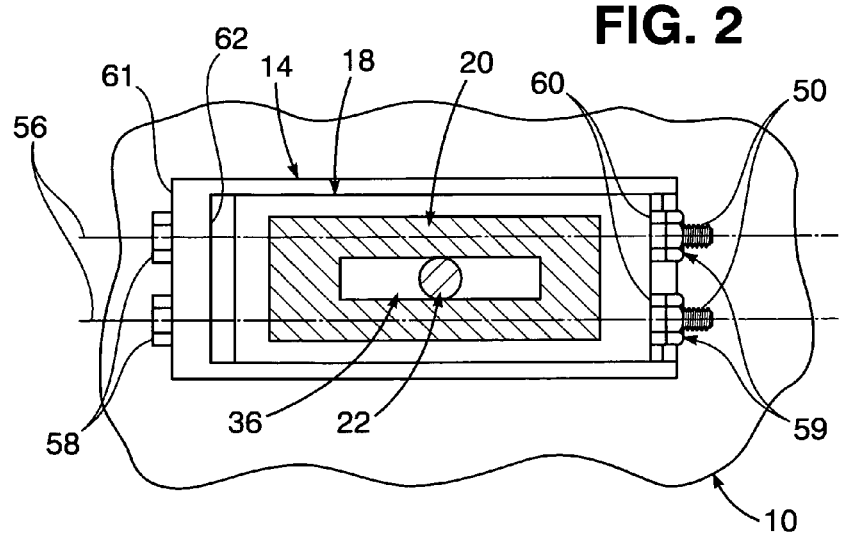

Pursuant to the present invention, the bearing washer 20 associated with the support assembly 14 has a spherical convex surface 30 extending between opposite ends 32 in spaced relation to a flat surface 34 as shown in FIGS. 1, 4 and 5. The bearing washer 20 when inserted into the upper wedge 18, as shown in FIGS. 1, 2 and 4, is positioned within an elongated recess 36 formed in a top flat surface 38 of the upper wedge 18. The recess 36 has a lower concave surface contacted by the convex surface 30 of the inserted bearing washer 20 as shown in FIG. 4. A horizontally elongated hole 39 also extends through the bearing washer 20 as shown in FIGS. 5 and 6.

Referring now to FIGS. 1, 2, 3, 4 and 6, the lower wedge 16 has a flat bottom surface 40 and an inclined surface 42 extending from a small end 41 to a large end 43 of the wedge 16 for contact with a bottom inclined surface 44 of the upper wedge 18 at an acute angle $\theta°$ relative to the supporting surface on the foundation 10. The inclined surface 42 of the lower wedge 16, as shown in FIG. 6, has a recess 46 formed therein with a horizontally elongated hole 48 extending vertically therefrom through the flat bottom surface 40 of the lower wedge 16 as shown in FIG. 4, so as to receive the vertical threaded bolt 22 therethrough extending upwardly into the recess 36 in the upper wedge 18 and through the hole 39 in the bearing washer 20 into the equipment 12. FIG. 6 shows the horizontally elongated hole 48 being elongated in a horizontal direction, having a horizontal elongation length of $L_x$. A vertical shoulder 62 is formed in the lower wedge 16 by the recess 46 in close spaced relation to the large wedge end 43 so as to limit adjustable positioning of the upper wedge 18 therein.

When the upper wedge 18 is adjustably positioned relative to the lower wedge 16 by slidable displacement between the respective inclined wedge surfaces 42 and 44, the wedges 16 and 18 are fastened to each other by a pair of horizontal bolts 50 extending therethrough as shown in FIGS. 1-5. The bolts 50 extend horizontally through pairs of elongated holes 52 and regular holes 54 respectively formed in the lower wedge 16 and in the upper wedge 18 along horizontal axes 56 as indicated in FIG. 1. FIG. 6 shows the elongated holes 52 with the topmost part of the holes located below the topmost surface of the lower tapered wedge, the elongated holes 52 being elongated in a vertical direction, having a vertical elongation length of $L_y$. As shown in FIGS. 3 and 6, the vertical elongation length $L_y$ is greater than the diameter of the regular holes 54. As indicated in FIGS. 1, 2, and 6, the regular holes 54 extend all the way from the first end 101 to the second end 102, of the upper tapered wedge. The elongated holes 52 in the lower wedge 16 are of sufficient length between the ends thereof so that the horizontal bolts 50 if engaging such ends of the holes 52 will not be subjected to load punishment under severe shock and/or vibration conditions. Bolt heads 58 respectively connected to the bolts 50 abut a larger end 57 of the lower tapered wedge 16, while regular fastener nuts 59 and lock nuts 60 are threadedly positioned on the bolts 50 so as to abut a larger end 57 of the upper tapered wedge 18 as shown in FIGS. 1 and 2. The support assembly 14 is thereby locked in its adjusted position on the attachment surface of the equipment 12 closely spaced above the top surface 38 of the upper wedge 18. The shoulder 62 formed in the lower wedge 16 prevents excessive shear or bend loading of the horizontal bolts 50 so that they are always held under tension by the nuts 59. As a result of the foregoing described features of the support assembly 14, adjustable installation of the equipment 12 on the foundation 10 is enhanced and severe accidental shear or bending of the bolts 50 is avoided for a prolonged life of the equipment 12.

Obviously, other modifications and variations of the present invention may be possible in light of the foregoing teachings. It is therefore to be understood that within the scope of the appended claims the invention may be practiced otherwise than as specifically described.

What is claimed is:

1. In combination with a foundation on which equipment is supported in an adjusted position by a support assembly having interrelated tapered wedges releasably attached between the foundation and the equipment, means for enhancing installational support of the equipment on the foundation by the support assembly, comprising: bearing means inserted into an upper one of the tapered wedges for establishing a close spaced relationship between the equipment and said upper one of the tapered wedges in the adjusted position of the equipment, wherein the upper one of the tapered wedges has horizontal holes formed therein and positioned in alignment with vertically elongated holes formed in the lower one of the tapered wedges through which attachment bolts extend between the tapered wedges in the adjusted position of the equipment, wherein the lower tapered wedge has horizontally elongated holes formed therein in alignment with a bolt hole formed in the bearing means through which a vertical attachment bolt extends between the foundation and the equipment, and wherein said bearing means comprises: a washer having a flat top surface in contact with the equipment and a lower convex surface that is inserted into a horizontally elongated recess formed in the upper tapered wedge having a concave surface contacted by the convex surface of the washer in the adjustably positioned support assembly.

2. A support assembly for enhancing support of equipment on a foundation, the support assembly, comprising: a beating arrangement; a pair of horizontal attachment bolts; an upper tapered wedge, the upper tapered wedge having: a first end, a second end, a first side, and a second side, the first and second sides substantially perpendicular to the first and second ends; a bearing opening in an upper surface, the bearing arrangement inserted into the beating opening; and a pair of horizontally extending holes, each hole extending from the first end to the second end of the upper tapered wedge, the pair of holes having a hole diameter; a lower tapered wedge positioned below and in sliding contact with the upper tapered wedge, the lower tapered wedge having: a large end; a pair of vertically elongated holes at the large end, a topmost part of each hole of the pair of vertically elongated holes located below the topmost surface of the lower tapered wedge, the pair of vertically elongated holes having a vertical elongation length, the vertical elongation length being greater than the hole diameter of the pair of horizontally extending holes of the upper tapered wedge, wherein the pair of vertically elongated holes are aligned with the pair of horizontally extending holes such that each of the pair of horizontal attachment bolts extend horizontally from the upper tapered wedge to the lower tapered wedge by extending through one vertically elongated hole of the pair of vertically elongated holes and through one horizontally extending hole of the pair of horizontally extending holes, the pair of horizontal attachment bolts being vertically displaceable within the vertically elongated holes, wherein the lower tapered wedge further includes a recess formed therein for making the slidable contact with the upper tapered wedge for adjustably positioning the upper tapered wedge, the pair of horizontal attachment bolts holding the upper tapered wedge in an adjusted position within the recess, wherein the bearing arrangement comprises: a washer having a fiat top surface for contacting the equipment and a lower convex surface, the bearing arrangement inserted into the bearing opening in the upper tapered wedge, the bearing opening having a concave surface contacted by the convex surface of the washer, further including a vertical attachment bolt extending vertically through the beating arrangement, the upper tapered wedge, and the lower tapered wedge, wherein the lower tapered wedge further includes a horizontally elongated hole, through which the vertical attachment bolt extends, the vertical attachment bolt being horizontally displaceable within the horizontally elongated hole.

* * * * *